(12) United States Patent
Solomon

(10) Patent No.: US 8,718,073 B2
(45) Date of Patent: *May 6, 2014

(54) METHOD AND APPARATUS FOR SIGNALING VIRTUAL CHANNEL SUPPORT IN COMMUNICATION NETWORKS

(75) Inventor: Gary A. Solomon, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 138 days.

This patent is subject to a terminal disclaimer.

(21) Appl. No.: 13/352,291

(22) Filed: Jan. 17, 2012

(65) Prior Publication Data

US 2012/0113988 A1 May 10, 2012

Related U.S. Application Data

(63) Continuation of application No. 10/888,212, filed on Jul. 9, 2004, now Pat. No. 8,098,669.

(60) Provisional application No. 60/492,566, filed on Aug. 4, 2003.

(51) Int. Cl.
*H04L 12/28* (2006.01)

(52) U.S. Cl.
USPC .................................... 370/399; 370/395.1

(58) Field of Classification Search
None
See application file for complete search history.

(56) References Cited

U.S. PATENT DOCUMENTS

| | | | |
|---|---|---|---|
| 4,975,905 A * | 12/1990 | Mann et al. .................. | 370/409 |
| 5,353,282 A | 10/1994 | Dormer et al. | |
| 5,574,934 A | 11/1996 | Mirashrafi et al. | |
| 5,625,779 A | 4/1997 | Solomon et al. | |
| 5,740,385 A | 4/1998 | Hayek et al. | |
| 5,742,603 A | 4/1998 | Shafir et al. | |
| 5,745,837 A | 4/1998 | Fuhrmann | |
| 5,777,984 A | 7/1998 | Gun et al. | |
| 5,953,338 A | 9/1999 | Ma et al. | |
| 6,081,848 A | 6/2000 | Grun et al. | |

(Continued)

FOREIGN PATENT DOCUMENTS

| | | |
|---|---|---|
| EP | 1102437 A1 | 5/2001 |
| WO | 02/03622 A1 | 1/2002 |
| WO | 03/019391 A2 | 3/2003 |
| WO | 2005/015830 A1 | 2/2005 |

OTHER PUBLICATIONS

International Search Report and Written opinion received for PCT Application No. PCT/US2004/025213, mailed on Jun. 12, 2004, 17 pages.

(Continued)

*Primary Examiner* — David Oveissi
(74) *Attorney, Agent, or Firm* — Cavem & Aghevli LLC

(57) ABSTRACT

A method and apparatus for signaling virtual channel support in communication networks. A node receives a data packet from another node to examine whether the other node commonly supports one or more virtual channels of a given type on a point-to-point communication link between the nodes, and the node signaling common support for one or more virtual channels of a given type, based on the content in the received data packet that indicates whether the other node transmitting the data packet has adequate queue resources to support one or more virtual channels of a given type, and based on whether the node has adequate queue resources to support the one or more virtual channels of a given type.

19 Claims, 5 Drawing Sheets

(56) References Cited

U.S. PATENT DOCUMENTS

| | | | |
|---|---|---|---|
| 6,212,589 B1 | 4/2001 | Hayek et al. | |
| 6,266,345 B1 | 7/2001 | Huang | |
| 6,285,659 B1 | 9/2001 | Feuerstraeter et al. | |
| 6,304,549 B1 | 10/2001 | Srinivasan et al. | |
| 6,317,803 B1 | 11/2001 | Rasmussen et al. | |
| 6,393,506 B1 | 5/2002 | Kenny | |
| 6,442,632 B1 | 8/2002 | Hayek et al. | |
| 6,512,767 B1 | 1/2003 | Takeda et al. | |
| 6,647,474 B2 | 11/2003 | Vishlitzky et al. | |
| 6,691,192 B2 | 2/2004 | Ajanovic et al. | |
| 6,999,421 B1 | 2/2006 | Holzworth et al. | |
| 7,058,008 B1 | 6/2006 | Wilson et al. | |
| 7,089,234 B2 | 8/2006 | Dugan et al. | |
| 7,107,335 B1 | 9/2006 | Arcieri et al. | |
| 7,240,123 B2 | 7/2007 | Kamboh et al. | |
| 7,376,828 B1 * | 5/2008 | Voit et al. | 713/153 |
| 2001/0056459 A1 | 12/2001 | Kurose et al. | |
| 2002/0131412 A1 | 9/2002 | Shah et al. | |
| 2002/0184358 A1 * | 12/2002 | Traversat et al. | 709/223 |
| 2003/0076831 A1 | 4/2003 | Van Doren et al. | |
| 2003/0115391 A1 | 6/2003 | Ajanovic et al. | |
| 2003/0151621 A1 | 8/2003 | Mcevilly et al. | |
| 2004/0170178 A1 * | 9/2004 | Motobayashi | 370/395.1 |

OTHER PUBLICATIONS

International Preliminary Report on Patentability and Written opinion received for PCT Application No. PCT/US2004/025213, mailed on Feb. 16, 2006, 12 pages.

PCI Express™ Base Specification, Revision 1.0a, Apr. 15, 2003, 426 pages.

InfiniBand™ Architecture Specification, vol. 1, Release 1.1, Final Release, Nov. 6, 2002, 1727 Pages.

InfiniBand™ Architecture Specification, vol. 2, Release 1.1, Final, Nov. 6, 2002, 700 pages.

* cited by examiner

InitFC-BVC 310

| +0 | +1 | +2 | +3 |
|---|---|---|---|
| 7\|6\|5\|4\|3\|2\|1\|0 | 7\|6\|5\|4\|3\|2\|1\|0 | 7\|6\|5\|4\|3\|2\|1\|0 | 7\|6\|5\|4\|3\|2\|1\|0 |
| 0\|1\|1\|1\|VCIndex0-7 | Bypass Queue Credits VC ID | Ordered Queue Credits VC ID | |
| CRC-16 | | | |

FIG. 3a

InitFC-OVC 320

| +0 | +1 | +2 | +3 |
|---|---|---|---|
| 7\|6\|5\|4\|3\|2\|1\|0 | 7\|6\|5\|4\|3\|2\|1\|0 | 7\|6\|5\|4\|3\|2\|1\|0 | 7\|6\|5\|4\|3\|2\|1\|0 |
| 0\|1\|1\|1\|VC Index 8-11 | Ordered Queue Credits VC ID + 1 | Ordered Queue Credits VC ID | |
| CRC-16 | | | |

FIG. 3b

InitFC-MVC 330

| +0 | +1 | +2 | +3 |
|---|---|---|---|
| 7\|6\|5\|4\|3\|2\|1\|0 | 7\|6\|5\|4\|3\|2\|1\|0 | 7\|6\|5\|4\|3\|2\|1\|0 | 7\|6\|5\|4\|3\|2\|1\|0 |
| 0\|1\|1\|1\|VC Index 12-13 | Multicast Queue Credits VC ID + 1 | Multicast Queue Credits VC ID | |
| CRC-16 | | | |

FIG. 3c

Table 405

| VC Index | VC ID | Description |
|---|---|---|
| 0 | 0 | Bypass Capable Virtual Channel (BVC) |
| 1 | 1 | |
| 2 | 2 | |
| 3 | 3 | |
| 4 | 4 | |
| 5 | 5 | |
| 6 | 6 | |
| 7 | 7 | |
| 8 | 8 & 9 | Ordered-Only Virtual Channel (OVC) |
| 9 | 10 & 11 | |
| 10 | 12 & 13 | |
| 11 | 14 & 15 | |
| 12 | 16 & 17 | Multicast VC (MVC) |
| 13 | 18 & 19 | |

METHOD AND APPARATUS FOR SIGNALING VIRTUAL CHANNEL SUPPORT IN COMMUNICATION NETWORKS

RELATED MATTERS

The present application is a continuation of U.S. patent application Ser. No. 10/888,212, filed Jul. 9, 2004, entitled "Method and apparatus for signaling virtual channel support in communication networks", issued as U.S. Pat. No. 8,098,669 on Jan. 17, 2012, which claims priority to and benefit of U.S. Provisional Application No. 60/492,566, filed Aug. 4, 2003, which are incorporated herein by reference in their entirety and for all purposes.

FIELD

Embodiments of the invention generally relate to the field of electronic systems, and more particularly, to a method and apparatus for signaling virtual channel support in communication networks.

BRIEF DESCRIPTION OF THE DRAWINGS

The invention is illustrated by way of example, and not by way of limitation, in the figures of the accompanying drawings in which like reference numerals refer to similar elements and in which:

FIG. 3a is a graphical illustration of a BVC flow control credit initialization data link layer packet (DLLP) format, according to one embodiment of the invention;

FIG. 3b is a graphical illustration of an OVC flow control credit initialization DLLP format, according to one embodiment of the invention;

FIG. 3c is a graphical illustration of a MVC flow control credit initialization DLLP format, according to one embodiment of the invention;

DETAILED DESCRIPTION

Embodiments of the invention are generally directed to a method and apparatus for signaling virtual channel support in communication networks. In accordance with one example embodiment, a virtual channel (VC) support manager is introduced herein. As described more fully below, the innovative VC support manager is operable to signal support for one or more virtual channels of a given type on a point-to-point communication link with another node, based on the content of a data packet received from another node on the point-to-point communication link.

Figure 1:
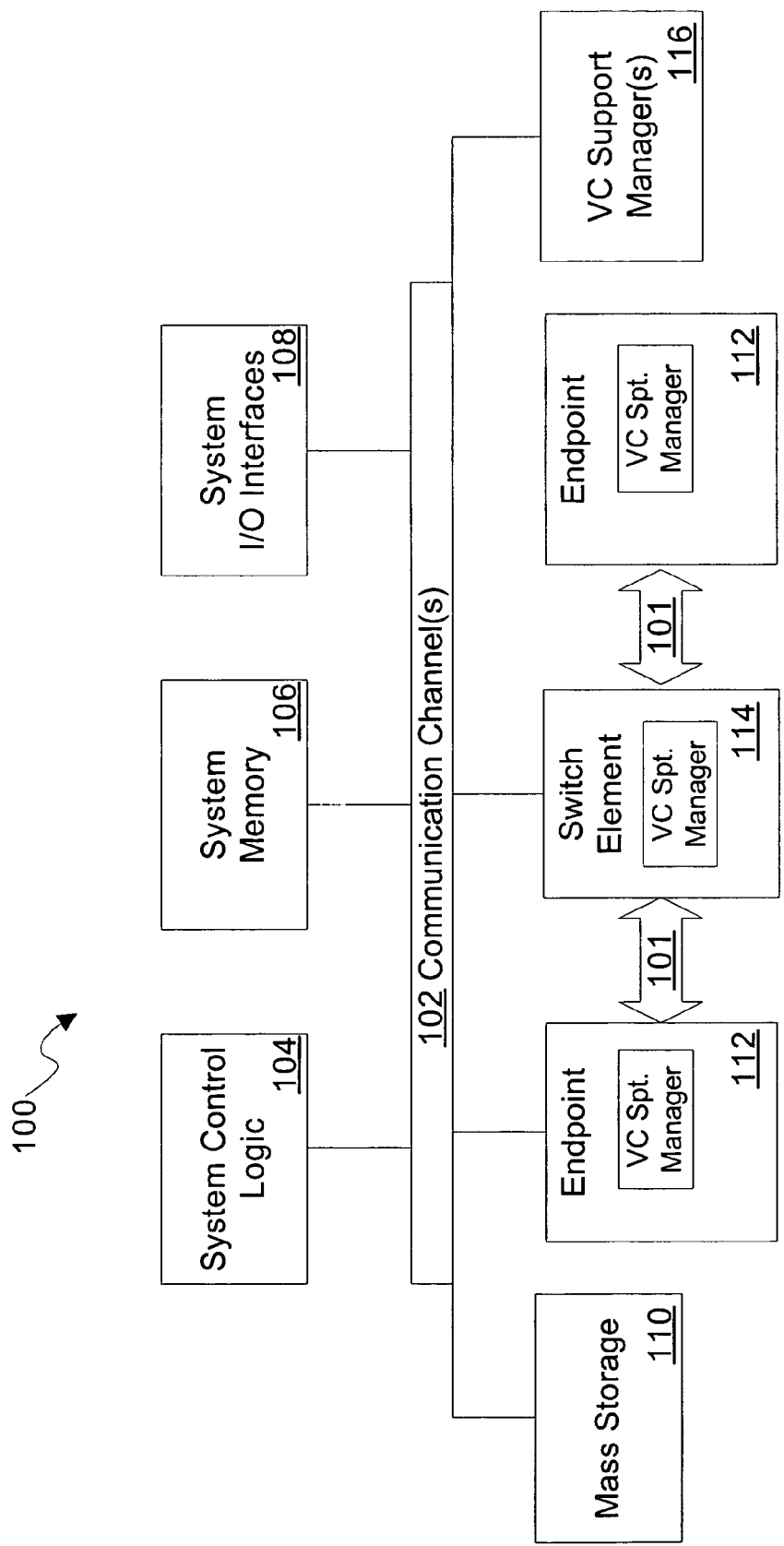
FIG. 1 is a block diagram of an electronic system, according to one embodiment of the invention.

FIG. 1 is a block diagram of an electronic system in which the invention may be embodied. Electronic system 100 may be, for example, a server, a switch, a router or a switch fabric for a communication network. Electronic system 100 comprises a point-to-point communication link 101, communication channel 102, system control logic 104, system memory 106, input/output (I/O) interfaces 108, mass storage 110, endpoint 112, switch element 114 and VC Support manager(s) 116, each coupled as depicted.

Data and/or instructions (hereinafter referred to as "data") may be transmitted through point-to-point communication link 101 in electronic system 100 from a source node to a destination node. For example, the source node may be endpoint 112 and the destination node may be another endpoint 112. Data may also be transmitted on point-to-point communication link 101 from the source node to the destination node through an intermediary node or a series of intermediary nodes, such as switch element 114. In that regard, data may also be transmitted on more that one point-to-point communication link 101 between an endpoint 112 through a switch element 114 to another endpoint 112 (as shown in FIG. 1) or between a switch element 114 and another switch element 114 on point-to-point communication link 101.

According to an example embodiment, virtual channels are utilized to facilitate the efficient transmission of data on point-to-point communication link 101. These virtual channels provide a means of supporting multiple independent logical communication channels on point-to-point communication link 101. Thus, for example, data can be logically channeled by multiplexing data streams onto point-to-point communication link 101 between endpoint 112 and switch element 114.

Before data can be transmitted on point-to-point communication link 101, adequate queue resources are needed by endpoint 112 and switch element 114 to support a given virtual channel of a given type on the link. As will be explained in more detail below, an indication of adequate queue resources (i.e. sufficient available buffer capacity to handle data on a given virtual channel) is indicated or communicated to endpoint 112 and switch element 114 by exchanging data packets on point-to-point communication link 101.

Various virtual channel types assist in the efficient transmission of data on point-to-point communication link 101, such as bypass capable virtual channels (BVC), ordered-only virtual channels (OVC), or multicast virtual channels (MVC). In an example embodiment, a BVC is supported by two types of queue resources, a bypass queue and an ordered queue. An ordered queue is a first-in-first out (FIFO) queue. A bypass queue is a separate FIFO queue in which data that is marked as "bypassable" is placed. By placing the "bypassable" data in the bypass queue, and placing other data in the ordered queue, the other data can continue to pass through the ordered queue should the "bypassable" packets become stalled or delayed, thus avoiding potential data deadlocks on point-to-point communication link 101. An OVC is supported by one type of queue resource, namely, a single ordered queue.

BVC and OVC virtual channel types are used to transmit unicast data (data addressed to one destination). MVC virtual channel types are used to transmit multicast data (data addressed to one or more destinations). MVC virtual channel types use one type of queue resource, a single FIFO queue, which is similar to the resources needed to support an OVC. However, since multicast data, as opposed to unicast data, is routed through MVC virtual channel types on point-to-point communication link 101, the single FIFO queue is deemed a multicast queue.

In an example embodiment, communication protocols are introduced which, as will be developed more fully below, support one or more innovative features including, but not limited to, indicating support for one or more virtual channels of a given type on point-to-point communication link 101. This communication protocol may be used by VC support manager(s) 116 to determine a switch element 114 and/or an endpoint 112's support for one or more virtual channels on point-to-point communication link 101.

Figure 2:
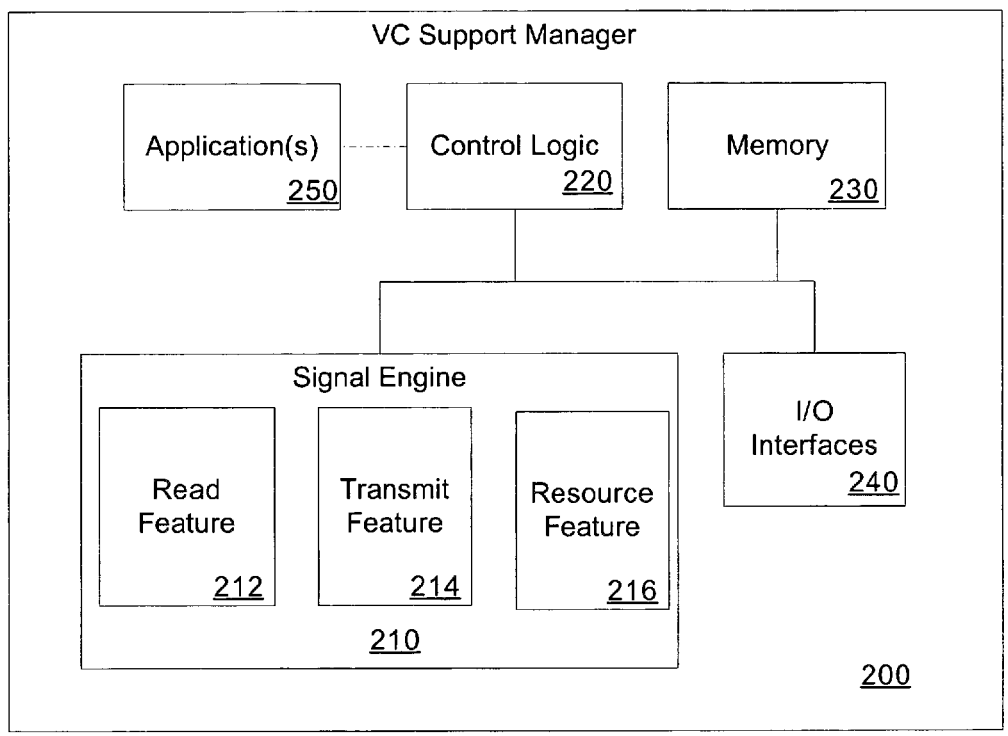
FIG. 2 is an architectural diagram of a virtual channel support manager, according to one embodiment of the invention.

FIG. 2 is an architectural diagram of a virtual channel support manager, according to one embodiment of the invention. In FIG. 2, VC support manager 200 comprises a signal engine 210, control logic 220, memory 230, I/O interfaces 240, and optionally one or more application(s) 250, each coupled as depicted.

In FIG. 2, signal engine 210 includes a read feature 212, transmit feature 214 and resource feature 216. As developed more fully below, these features transmit and read data link layer packets (DLLPs) that include content to indicate whether a node (i.e. endpoint 112 or switch element 114) supports one or more virtual channels on a point-to-point communication link to another node.

As used herein, control logic 220 controls the overall operation of VC support manager 200 and is intended to represent any of a wide variety of logic device(s) and/or executable content to implement the control of VC support manager 200, described herein. In this regard, control logic 220 may well be comprised of a microprocessor, network processor, microcontroller, FPGA, ASIC, or executable content to implement such control features, and/or any combination thereof. In alternate embodiments, the features and functionality of control logic 220 may well be implemented within signal engine 210.

Control logic 220 selectively invokes an instance of signal engine 210 to signal whether each node or a node supports one or more virtual channels of a given type on a point-to-point communication link between two nodes based, at least in part, on the content of DLLPs exchanged between the nodes.

As used herein, memory 230 is intended to represent a wide variety of memory media including, but not limited to volatile memory, non-volatile memory, flash and programmatic variables or states. According to an example embodiment, memory 230 is used by signal engine 210 to temporarily store information related to one or more node's resources to support one or more virtual channels of a given type on a point-to-point communication link. In this regard, memory 230 includes virtual channel queue resources tables with one or more entries for placing information related to the node's or both nodes queue resources to support one or more virtual channels of a given type on the point-to-point communication link.

Memory 230 may also include memory registers to store bit flags which are asserted or de-asserted by signal engine 210 to signal support for one or more virtual channels of a given type on the point-to-point communication link between the nodes.

Memory 230 may also store executable content. The executable content is used by control logic 220 to implement an instance of signal engine 210 to exchange DLLPs between the nodes and signal a node's virtual channel support, based on the content of the exchanged DLLPs.

As used herein, I/O interfaces 240 provides a communications interface between VC support manager 200 and an electronic system. For example, VC support manager 200 is implemented as an element of a computer system, wherein I/O interfaces 240 provides a communications interface between VC support manager 200 and the computer system via a communication channel. In this regard, control logic 220 can receive a series of instructions from application software external to VC support manager 200 via I/O interfaces 240. In that regard, the series of instructions may invoke control logic 220 to implement one or more features of signal engine 210.

In an example embodiment, VC support manager 200 includes one or more application(s) 250 to provide internal instructions to control logic 220. As used herein, such application(s) 250 may well be invoked to generate a user interface, e.g., a graphical user interface (GUI), to enable administrative features, and the like. In alternate embodiments, one or more features of signal engine 210 may well be implemented as an application(s) 250, selectively invoked by control logic 220 to invoke such features.

In one embodiment, a VC support manager 200 is located within switch element 114. In that regard, VC support manager 200 invokes an instance of read feature 212 to read a DLLP received at switch element 114 over point-to-point communication link 101, for example, from endpoint 112. Additionally, VC support manager 200 also selectively invokes an instance of resource feature 216 to determine the queue resources switch element 114 supports for a virtual channel of a given type on point-to-point communication link 101. In an example implementation, as will be explained in more detail below, the invoking of read feature 212 occurs concurrently with the invoking of resource feature 216.

Resource feature 216 populates a first temporary virtual channel queue resources table, e.g. maintained in memory 230, with one or more entries indicating the amount of queue resources switch element 114 supports for the virtual channel of a given type on point-to-point communication link 101. As introduced above and explained in more detail below, such queue resources indicate support for one or more virtual channels of a given type that includes BVC, OVC and/or MVC virtual channel types.

Once resource feature 216 populates a first temporary virtual channel queue resources table for switch element 114, VC support manager 200 then selectively invokes an instance of transmit feature 214. Transmit feature 214, based, at least in part, on the queue resources populated in the first temporary virtual channel queue resources table, generates one or more DLLPs and transmits the DLLPs to indicate switch element 114's support or lack of support for the virtual channel of a given type on point-to-point communication link 101.

Further, read feature 212, based, at least in part, on the content of the one or more DLLPs received at switch element 114, populates a second temporary virtual channel queue resources table, e.g. maintained in memory 230, with the amount of queue resources indicated in the one or more DLLPs received from a node at the other end of the point-to-point link 101, for example, endpoint 112. Once the first and second temporary virtual channel queue resources tables are populated, resource feature 216 then reads the first and second temporary virtual channel queue resources tables. Resource feature 216 then, based, at least in part, on the contents of temporary virtual channel queue resources tables, signal whether the virtual channel of a given type on point-to-point communication link 101 is supported.

This process of exchanging DLLPs continues until switch element 114's support is determined for each of the one or more virtual channels on point-to-point communication link 101.

In one embodiment, VC support manager 200 may be located within endpoint 112. Thus, VC support manager 200 determines endpoint 112's support for one or more virtual channels of a given type on point-to-point communication link 101. In other embodiments, VC support manager 200 may be located outside of endpoint 112 and switch element 114 to determine and signal both nodes' support for one or more virtual channels of a given type on point-to-point communication link 101.

According to an example embodiment, resource feature 216 signals support of a virtual channel of a given type by asserting or de-asserting a bit flag in a memory register stored in a memory (i.e. in memory 230) accessible to elements of VC support manager 200 or elements external to VC support manager 200 via I/O interfaces 240.

FIG. 3a is a graphical illustration of a BVC flow control credit initialization data link layer packet (DLLP) format, according to one embodiment of the invention. InitFC-BVC 310 is depicted comprising a 32-bit BVC initial credit DLLP format, although the invention is not limited to a 32-bit format.

In an example embodiment, one or more InitFC-BVC 310 DLLPs are transmitted by endpoint 112 or switch element 114 to indicate support on a virtual channel of BVCs on point-to-point communication link 101. The InitFC-BVC 310 DLLPs each contain two fields to indicate BVC support: a Bypass Queue Credits field and an Ordered Queue Credits field. As will be explained in more detail in FIG. 4a, a virtual channel identifier is contained in a third field and is shown as "VC index in the range 0-7."

As mentioned previously, in order to support a BVC, both endpoint 112 and switch element 114 need adequate queue resources to support both a bypass and an ordered queue on the virtual channel. Serving as an advertisement of bypass and ordered queue depths or capacities, a non-zero value within both the Bypass Queue and Ordered Queue Credits fields of each InitFC-BVC 310 DLLP indicates a BVC is supported for the given virtual channel identifier on point-to-point communication link 101.

FIG. 3b is a graphical illustration of an OVC flow control credit initialization DLLP format, according to one embodiment of the invention. In FIG. 3b, an InitFC-OVC DLLP is depicted as InitFC-OVC 320.

In an example embodiment, one or more InitFC-OVC 320 DLLPs are transmitted by endpoint 112 or switch element 114 to indicate support of OVCs on one or more virtual channels on point-to-point communication link 101. The InitFC-OVC 320 DLLPs each contain two fields to indicate OVC support for two virtual channels at a time. As will be explained in more detail in FIG. 4a, a virtual channel identifier is contained in a third field and is shown as "VC index 8-11."

Serving as an advertisement of ordered queue depth or capacity, a non-zero value within the Ordered Queue Credit field of each InitFC-OVC 320 DLLP indicates an OVC is supported for the given virtual channel identifier on point-to-point communication link 101.

FIG. 3c is a graphical illustration of an example MVC flow control credit initialization DLLP format, according to one embodiment of the invention. In FIG. 3c, an InitFC-MVC DLLP is depicted as InitFC-MVC 330.

In an example embodiment, one or more InitFC-MVC 330 DLLPs are transmitted by endpoint 112 or switch element 114 to indicate support of MVCs on one or more virtual channels on point-to-point communication link 101. The InitFC-MVC 330 each contain two fields to indicate MVC support for two virtual channels at a time. As will be explained in more detail in FIG. 4a, a virtual channel identifier is contained in a third field and is shown as "VC index 12-13."

Serving as an advertisement of multicast queue depth or capacity, a non-zero value within the Multicast Queue Credit field of each InitFC-MVC 330 DLLP indicates a MVC is supported for the given virtual channel identifier on point-to-point communication link 101.

Figures 4A, 4B:
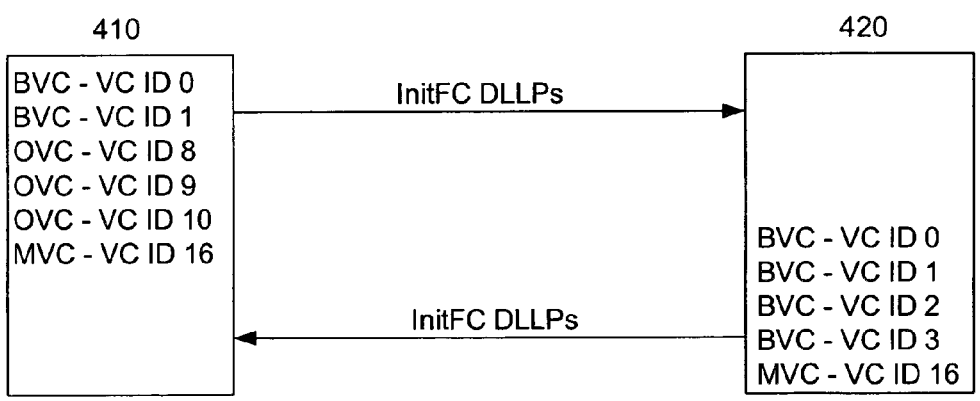
FIG. 4a is a graphical illustration of a relationship between VC Index and VC ID, according to one embodiment of the invention.
FIG. 4b is a graphical illustration of a exchanging flow control credit initialization DLLPs between two nodes, according to one embodiment of the invention.

FIG. 4a is a graphical illustration of a relationship between VC Index and VC ID, according to one embodiment of the invention. Table 405 lists assignments for a given virtual channel identifier number (VC ID) to a virtual channel index (VC index) and further lists assignments for a range of VC index numbers to either a BVC, OVC or MVC configuration, although the invention is not limited in this regard.

FIG. 4b is a graphical illustration of exchanging flow control credit initialization DLLPs between two nodes, according to one embodiment of the invention. Nodes 410 and 420 are shown in FIG. 4b as each indicating adequate queue resources for six and five virtual channels respectively. Node 410 indicates support for VC IDs 0, 1, 8, 9, 10 and 16, while Node 420 indicates support for VC IDs 0, 1, 2, 3 and 16.

According to an example embodiment, node 410 transmits to node 420 flow control initialization DLLPs with a non-zero credit value in the appropriate queue credit fields, at least one DLLP being associated with one or more supported virtual channels. When following the VC ID assignments listed in table 405, Node 410 transmits to Node 420 5 DLLPs with non-zero credit values for VC IDs 0, 1, 8, 9, 10 and 16 (since VC IDs 8 & 9 will be transmitted by the same DLLP with VC Index 8, see table 405). Node 420 will also transmit to node 410 up to 5 DLLPs with a non-zero credit value for VC IDs 0, 1, 2, 3 and 16.

Thus, in this example embodiment, based on the content of the exchanged flow control initialization DLLPs, only VC IDs 0, 1 and 16 are commonly supported by nodes 410 and 420. Consequently, VC IDs 0, 1, and 16 are supported on the point-to-point communication link between nodes 410 and 420.

Figure 5:
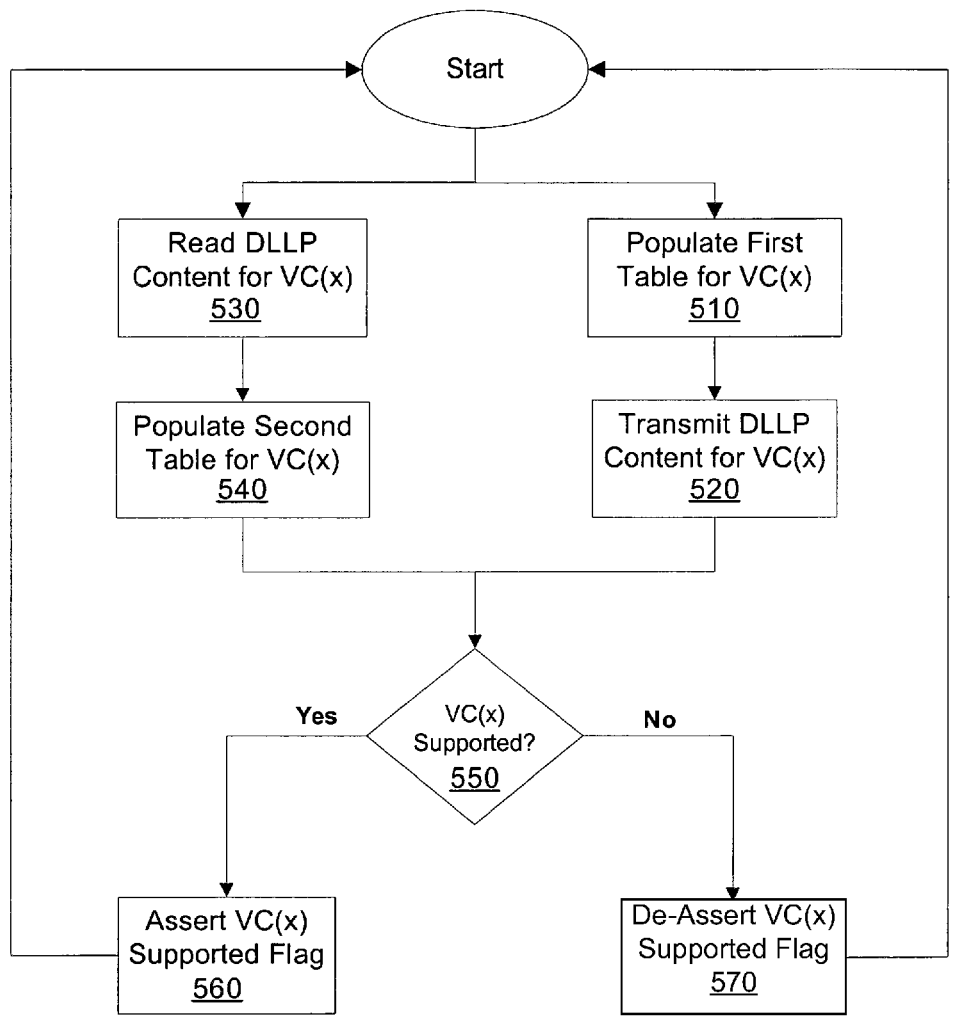
FIG. 5 is a flow chart of a method to indicate virtual channel support, according to one aspect of the invention.

FIG. 5 is a flow chart of an example method to signal virtual channel support, according to one aspect of the invention. In FIG. 5, two processes are shown as occurring concurrently, one process involves the transmission of DLLPs and the other involves the reading of DLLPs. In block 510, in response to control logic 220, signal engine 210 selectively invokes an instance of resource feature 216 to determine the queue resources a node, such as switch element 114, supports for a given virtual channel, VC(x), to transmit data on point-to-point communication link 101 to another node, such as endpoint 112.

Resource feature 216, in an example embodiment, then populates a first temporary virtual channel queue resources table, i.e., located in memory 230, with one or more entries reflecting the amount of queue resources for a virtual channel of a given type that switch element 114 supports for VC(x) on point-to-point communication link 101.

Once the first virtual channel queue resources table is populated by resource feature 216, the process moves to block 520. In block 520, signal engine 210 invokes an instance of transmit feature 214. Transmit feature 214 accesses the first temporary virtual channel queue resources table and generates a DLLP for VC(x) in the format of InitFC-BVC 310, InitFC-OVC 320 or InitFC-MVC 330 based, at least in part, on the contents in the first temporary virtual channel queue resources table.

Transmit feature 214 then transmits the DLLP for VC(x) over point-to-point communication link 101. This DLLP indicates switch element 114's available queue resources for a virtual channel of a given type for VC(x) on point-to-point communication link 101.

As mentioned previously, the reading of DLLPs occurs concurrently with the transmitting of DLLPs. In this regard, the process is further explained in block 530, wherein in response to control logic 220, signal engine 210 invokes an instance of read feature 212.

In an example embodiment, a DLLP for VC(x) formatted according to InitFC-BVC 310, InitFC-OVC 320 or InitFC-MVC 330, is sent by endpoint 112 to switch element 114 on point-to-point communication link 101.

Read feature 212 reads the virtual channel identifier field, (i.e. VC Index 0-7 for BVC, VC Index 8-11 for OVC and VC Index 12-13 for MVC), and the ordered queue credits fields and/or bypass queue credits field or multicast queue credits fields of the DLLP. Once the applicable fields of the DLLP are read by read feature 212, the process moves to block 540. In block 540, read feature 212, based on the content of the fields, populates a second temporary virtual channel queue resources table (i.e. in memory 230) with the amount of queue resources for VC(x) indicated in the DLLP.

Once the first and the second temporary virtual channel queue resources tables are populated by read feature 212, as described in blocks 510 and 540, the process moves to block 550. In block 550, resource feature 216 accesses the first and second temporary virtual channel queue resources tables and based, at least in part, on the contents of the temporary virtual channel queue resources tables, determines whether VC(x) is supported (i.e. adequate queue resource credits are present to support an ordered and/or bypass or multicast queues for VC(x) on point-to-point communication link 101).

If resource feature 216 determines that VC(x) is commonly supported, the process moves to block 560. In block 560, resource feature 216 signals, by the assertion of a bit flag, that VC(x) is commonly supported by endpoint 112 and switch element 114 on point-to-point communication link 101. The bit flag is asserted in a memory register stored in a memory (i.e. memory 230). The process then starts over to determine if additional VC(x)s are supported by endpoint 112 and switch element 114 on point-to-point communication link 101.

If resource feature 216 determines that VC(x) is not supported by endpoint 112, the process moves to block 570. In block 570, resource feature 216, signals by the de-assertion of a bit flag, that VC(x) is not supported by endpoint 112 and switch element 114 on point-to-point communication link 101. The bit flag is de-asserted in a memory register stored in a memory (i.e. in memory 230). The process then starts over to determine if additional VC(x)s are supported by endpoint 112 and switch element 114 on point-to-point communication link 101.

Referring again to the block diagram of FIG. 1 where electronic system 100 may be a server, a switch, a bridge or a switch fabric for a communication network, although the invention is not limited to these embodiments.

In accordance with one embodiment, system control logic 104 controls the overall operation of electronic system 100 and is intended to represent any of a wide variety of logic device(s) and/or executable content to implement the operation of electronic system 100, described herein. In this regard, system control logic 104 may well be comprised of a microprocessor, network processor, microcontroller, FPGA, ASIC, executable content to implement such control features and/or any combination thereof.

Electronic system 100 further includes system memory 106 to store information/features offered by electronic system 100. In this regard, system memory 106 is used to store temporary variables or other intermediate information during execution of instructions by system control logic 104. As used herein, system memory 106 may well include a wide variety of memory media including but not limited to volatile memory, non-volatile memory, flash, programmable variables or states, random access memory (RAM), read-only memory (ROM), flash, or other static or dynamic storage media.

In accordance with one example embodiment, machine-readable instructions can be provided to system memory 106 from a form of machine-accessible medium. As used herein, a machine-accessible medium is intended to represent any mechanism that provides (i.e., stores and/or transmits) information in a form readable by a machine (e.g., electronic system 100). For example, a machine-accessible medium may well include ROM; RAM; magnetic disk storage media; optical storage media; flash memory devices; electrical, optical, acoustical or other form of propagated signals (e.g., carrier waves, infrared signals, digital signals); and the like. Instructions may also be provided to system memory 106 via a remote connection through System I/O interfaces 108 (e.g., over a communication network).

Endpoint 112 represents an element of electronic system 100. Endpoint 112 may be either a source node or a destination node for data transmitted within and/or remote to electronic system 100. Endpoint 112 may well comprise one or more of a router, network processor, embedded logic, input/output port for a switch fabric and the like.

As used, herein, switch element 114 represents an element of electronic system 100 which acts as an intermediary node for data transmitted from one or more nodes located within and/or remote to electronic system 100. As used herein, switch element 114 is intended to represent any of a number of hardware and/or software element(s) to receive and transmit data. In this regard, according to one example embodiment, switch element 114 may well comprise one or more of an intermediary switch for a switch fabric, a bridge, a microprocessor, software application, embedded logic, or the like.

VC support manager(s) 116 may be encompassed within endpoint 112 and/or switch element 114. Alternatively, VC support manager(s) 116 may well be communicatively coupled to endpoint 112 and/or switch element 114 through e.g. communication channel 102 or through System I/O interfaces 108.

System I/O interfaces 108 may also enable one or more element(s), e.g., system control logic 104, to interact with input and/or output devices, for example, a mouse, keyboard, touchpad, cathode ray tube monitor, liquid crystal display, etc.

According to one example embodiment, VC support manager(s) 116 assistance in signaling a node's (i.e. endpoint 112 and/or switch element 114) support of one or more virtual channels of a given type on point-to-point communication link to another node may well be implemented in hardware, software, firmware, or any combination thereof. In this regard, VC support manager(s) 116 may well be implemented as one or more of an ASIC, special function controller or processor, FPGA, other hardware device and firmware or software to perform at least the functions described herein.

In the previous descriptions, for the purpose of explanation, numerous specific details were set forth in order to provide a thorough understanding of the invention. It will be apparent, however, to one skilled in the art, that the invention can be practiced without these specific details. In other instances, structures and devices were shown in block diagram form in order to avoid obscuring the invention.

References made in the specification to "one embodiment" or "an embodiment" means that a particular feature, structure or characteristic described in connection with that embodiment is included in at least one embodiment of the invention. Thus, the appearances of the phrase "in one embodiment"

appearing in various places throughout the specification are not necessarily all referring to the same embodiment. Likewise, the appearances of the phrase "in another embodiment," or "in an alternate embodiment" appearing in various places throughout the specification are not all necessarily referring to the same embodiment.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative of, rather than limiting the scope and coverage of the claims appended hereto.

The invention claimed is:

1. In a node, a method comprising:
receiving a data packet from another node to examine whether the other node commonly supports one or more virtual channels on a point-to-point communication link directly coupled between the nodes; and
signaling common support for one or more virtual channels, based on content in the received data packet that indicates whether the other node transmitting the data packet has adequate queue resource to support one or more virtual channels of a given type, and based on whether the node has adequate queue resources to support the one or more virtual channels of a given type,
wherein the node is to comprise a signal engine to indicate common support for the one or more virtual channels by asserting or deasserting a signal to cause change to a flag associated with the one or more supported virtual channels of a given type on the point-to-point communication link between the nodes and wherein once a first and a second temporary virtual channel queue resources tables are populated by a read feature, a resource feature is to cause access to the first and second temporary virtual channel queue resources tables and based, at least in part, on the contents of the first or second temporary virtual channel queue resources tables, is to cause a determination of whether a select virtual channel is supported.

2. A method according to claim 1, wherein the virtual channel of a given type comprises a bypass capable virtual channel that requires support for both an ordered queue and a bypass queue.

3. A method according to claim 1, wherein the virtual channel of a given type comprises an ordered-only virtual channel that requires support for an ordered queue.

4. A method according to claim 1 further comprising:
storing the flag in a memory.

5. The method of claim 1, wherein the one or more virtual channels of a given type comprise one of: a bypass capable virtual channel or an ordered-only virtual channel.

6. The method of claim 1, wherein the virtual channel of a given type is to comprise a multicast virtual channel to operate in response to a multicast queue.

7. An apparatus comprising:
a node; and
a virtual channel support manager, to signal the node's support for one or more virtual channels of a given type on a point-to-point communication link directly coupled with another node, based on content in a data packet received from the other node that indicate whether the other node has adequate queue resources to support the one or more virtual channels of a given type, and based on whether the node has adequate queue resources to support the one or more virtual channels of a given type,
wherein the node is to comprise a signal engine to indicate common support of the one or more virtual channels by asserting or deasserting a signal to cause change to a flag associated with the one or more virtual channels of a given type on the point-to-point communication link between the nodes; and
wherein once a first and a second temporary virtual channel queue resources tables are populated by a read feature, a resource feature is to cause access to the first and second temporary virtual channel queue resources tables and based, at least in part, on the contents of the first or second temporary virtual channel queue resources tables, is to cause a determination of whether a select virtual channel is supported.

8. An apparatus according to claim 7, wherein the virtual channel support manager asserts the flag in a memory register.

9. An apparatus according to claim 8, wherein the memory register is located in a memory coupled to the node.

10. An apparatus according to claim 7, the apparatus further comprising:
a memory to store executable content; and
a control logic, communicatively coupled with the memory, to execute the executable content, to implement an instance of the virtual channel support manager.

11. An apparatus according to claim 10, wherein the control logic comprises control logic implemented in a network processor.

12. An apparatus according to claim 11, wherein the node is an endpoint on a switch fabric in a communication network.

13. The apparatus of claim 7, wherein the one or more virtual channels of a given type comprise one of: a bypass capable virtual channel or an ordered-only virtual channel.

14. The apparatus of claim 7, wherein the virtual channel of a given type is to comprise a multicast virtual channel to operate in response to a multicast queue.

15. A system comprising:
a node;
a volatile memory; and
a virtual channel support manager, to signal the node's support for one or more virtual channels of a given type on a point-to-point communication link directly coupled with another node, based on content in a data packet received from the other node that indicates whether the other node has adequate queue resources to support the one or more virtual channels of a given type, and based on whether the node has adequate queue resources to support the one or more virtual channels of a given type,
wherein to signal the node's support, the virtual channel support manager asserts a bit flag associated with the one or more supported virtual channels of a given type and stores the bit flag in the volatile memory,
wherein the node is to comprise a signal engine to indicate common support by asserting or deasserting a signal to cause change to the bit flag associated with the one or more supported virtual channels of a given type on the point-to-point communication link between the nodes; and
wherein once a first and a second temporary virtual channel queue resources tables are populated by a read feature, a resource feature is to cause access to the first and second temporary virtual channel queue resources tables and based, at least in part, on the contents of the first or second temporary virtual channel queue resources tables, is to cause determination of whether a select virtual channel is supported.

16. A system according to claim 15, wherein the bit flag is stored in the volatile memory in a memory register that is accessible to the node.

17. A system according to claim 15, wherein the node is an endpoint on a switch fabric in a communication network.

18. The system of claim 15, wherein the one or more virtual channels of a given type comprise one of: a bypass capable virtual channel or an ordered-only virtual channel.

19. The system of claim 15, wherein the virtual channel of a given type is to comprise a multicast virtual channel to operate in response to a multicast queue.

* * * * *